US010611298B2

(12) United States Patent
Salter et al.

(10) Patent No.: US 10,611,298 B2
(45) Date of Patent: Apr. 7, 2020

(54) ILLUMINATED CARGO CARRIER

(71) Applicant: Ford Global Technologies, LLC, Dearborn, MI (US)

(72) Inventors: Stuart C. Salter, White Lake, MI (US); Paul Kenneth Dellock, Northville, MI (US); Annette Lynn Huebner, White Lake, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 317 days.

(21) Appl. No.: 15/456,845

(22) Filed: Mar. 13, 2017

(65) Prior Publication Data
US 2018/0257544 A1   Sep. 13, 2018

(51) Int. Cl.
| B60R 9/06 | (2006.01) |
| B60R 5/04 | (2006.01) |
| B60Q 1/30 | (2006.01) |
| B60Q 1/44 | (2006.01) |
| F21S 43/16 | (2018.01) |
| B60Q 1/26 | (2006.01) |

(52) U.S. Cl.
CPC ........... *B60Q 1/307* (2013.01); *B60Q 1/2603* (2013.01); *B60Q 1/2661* (2013.01); *B60Q 1/44* (2013.01); *B60R 5/04* (2013.01); *B60R 9/06* (2013.01); *F21S 43/16* (2018.01); *B60Q 1/30* (2013.01)

(58) Field of Classification Search
CPC .................................. B60Q 1/307; B60R 9/06
USPC ......................................................... 224/519
See application file for complete search history.

(56) References Cited

U.S. PATENT DOCUMENTS

| 2,486,859 | A | 11/1949 | Meijer et al. |
| 3,680,836 | A * | 8/1972 | Amelotte ................. B60P 3/36 254/426 |
| 5,038,983 | A * | 8/1991 | Tomososki ............. B60R 9/065 224/521 |
| 5,053,930 | A | 10/1991 | Benavides |
| 5,434,013 | A | 7/1995 | Fernandez |
| 5,709,453 | A | 1/1998 | Krent et al. |
| 5,839,718 | A | 11/1998 | Hase et al. |
| 6,006,973 | A * | 12/1999 | Belinky ................... B60R 9/06 224/500 |
| 6,031,511 | A | 2/2000 | DeLuca et al. |
| 6,117,362 | A | 9/2000 | Yen et al. |
| 6,294,990 | B1 | 9/2001 | Knoll et al. |
| 6,419,854 | B1 | 7/2002 | Yocom et al. |
| 6,494,490 | B1 | 12/2002 | Trantoul |
| 6,577,073 | B2 | 6/2003 | Shimizu et al. |
| 6,729,738 | B2 | 5/2004 | Fuwausa et al. |

(Continued)

FOREIGN PATENT DOCUMENTS

| CN | 101337492 A | 1/2009 |
| CN | 201169230 Y | 2/2009 |

(Continued)

*Primary Examiner* — Nathan J Newhouse
*Assistant Examiner* — Lester L Vanterpool
(74) *Attorney, Agent, or Firm* — David Coppiellie; Price Heneveld LLP

(57) ABSTRACT

A cargo carrier includes a housing defining an interior surface and an exterior surface. A light assembly is positioned along the exterior surface. A grate is positioned within the housing. A luminescent structure is positioned on the grate. A light source is positioned on the interior surface and configured to emit light onto the luminescent structure.

19 Claims, 11 Drawing Sheets

(56) References Cited

U.S. PATENT DOCUMENTS

| | | | |
|---|---|---|---|
| 6,737,964 B2 | 5/2004 | Samman et al. |
| 6,773,129 B2 | 8/2004 | Anderson, Jr. et al. |
| 6,820,888 B1 | 11/2004 | Griffin |
| 6,851,840 B2 | 2/2005 | Ramamurthy et al. |
| 6,859,148 B2 | 2/2005 | Miller |
| 6,871,986 B2 | 3/2005 | Yamanaka et al. |
| 6,953,536 B2 | 10/2005 | Yen et al. |
| 6,990,922 B2 | 1/2006 | Ichikawa et al. |
| 7,015,893 B2 | 3/2006 | Li et al. |
| 7,161,472 B2 | 1/2007 | Strumolo et al. |
| 7,213,923 B2 | 5/2007 | Liu et al. |
| 7,216,997 B2 | 5/2007 | Anderson, Jr. |
| 7,249,869 B2 | 7/2007 | Takahashi et al. |
| 7,264,366 B2 | 9/2007 | Hulse |
| 7,264,367 B2 | 9/2007 | Hulse |
| 7,347,576 B2 | 3/2008 | Wang et al. |
| 7,393,037 B2 * | 7/2008 | Hwang ................. B60R 7/02 224/400 |
| 7,441,914 B2 | 10/2008 | Palmer et al. |
| 7,501,749 B2 | 3/2009 | Takeda et al. |
| 7,575,349 B2 | 8/2009 | Bucher et al. |
| 7,635,212 B2 | 12/2009 | Seidler |
| 7,726,856 B2 | 6/2010 | Tsutsumi |
| 7,745,818 B2 | 6/2010 | Sofue et al. |
| 7,753,541 B2 | 7/2010 | Chen et al. |
| 7,834,548 B2 | 11/2010 | Jousse et al. |
| 7,862,220 B2 | 1/2011 | Cannon et al. |
| 7,987,030 B2 | 7/2011 | Flores et al. |
| 8,016,465 B2 | 9/2011 | Egerer et al. |
| 8,022,818 B2 | 9/2011 | la Tendresse et al. |
| 8,044,415 B2 | 10/2011 | Messere et al. |
| 8,066,416 B2 | 11/2011 | Bucher |
| 8,071,988 B2 | 12/2011 | Lee et al. |
| 8,097,843 B2 | 1/2012 | Agrawal et al. |
| 8,118,441 B2 | 2/2012 | Hessling |
| 8,120,236 B2 | 2/2012 | Auday et al. |
| 8,136,425 B2 | 3/2012 | Bostick |
| 8,163,201 B2 | 4/2012 | Agrawal et al. |
| 8,169,131 B2 | 5/2012 | Murazaki et al. |
| 8,178,852 B2 | 5/2012 | Kingsley et al. |
| 8,197,105 B2 | 6/2012 | Yang |
| 8,203,260 B2 | 6/2012 | Li et al. |
| 8,207,511 B2 | 6/2012 | Bortz et al. |
| 8,232,533 B2 | 7/2012 | Kingsley et al. |
| 8,247,761 B1 | 8/2012 | Agrawal et al. |
| 8,261,686 B2 | 9/2012 | Birman et al. |
| 8,286,378 B2 | 10/2012 | Martin et al. |
| 8,317,329 B2 | 11/2012 | Seder et al. |
| 8,317,359 B2 | 11/2012 | Harbers et al. |
| 8,408,766 B2 | 4/2013 | Wilson et al. |
| 8,415,642 B2 | 4/2013 | Kingsley et al. |
| 8,421,811 B2 | 4/2013 | Odland et al. |
| 8,459,832 B2 | 6/2013 | Kim |
| 8,466,438 B2 | 6/2013 | Lambert et al. |
| 8,519,359 B2 | 8/2013 | Kingsley et al. |
| 8,519,362 B2 | 8/2013 | Labrot et al. |
| 8,539,702 B2 | 9/2013 | Li et al. |
| 8,552,848 B2 | 10/2013 | Rao et al. |
| 8,606,430 B2 | 12/2013 | Seder et al. |
| 8,624,716 B2 | 1/2014 | Englander |
| 8,631,598 B2 | 1/2014 | Li et al. |
| 8,653,553 B2 | 2/2014 | Yamazaki et al. |
| 8,664,624 B2 | 3/2014 | Kingsley et al. |
| 8,683,722 B1 | 4/2014 | Cowan |
| 8,724,054 B2 | 5/2014 | Jones |
| 8,754,426 B2 | 6/2014 | Marx et al. |
| 8,773,012 B2 | 7/2014 | Ryu et al. |
| 8,846,184 B2 | 9/2014 | Agrawal et al. |
| 8,851,694 B2 | 10/2014 | Harada |
| 8,876,352 B2 | 11/2014 | Robbins et al. |
| 8,905,610 B2 | 12/2014 | Coleman et al. |
| 8,952,341 B2 | 2/2015 | Kingsley et al. |
| 8,994,495 B2 | 3/2015 | Dassanayake et al. |
| 9,006,751 B2 | 4/2015 | Kleo et al. |
| 9,018,833 B2 | 4/2015 | Lowenthan et al. |
| 9,057,021 B2 | 6/2015 | Kingsley et al. |
| 9,059,378 B2 | 6/2015 | Verger et al. |
| 9,065,447 B2 | 6/2015 | Buttolo et al. |
| 9,067,530 B2 | 6/2015 | Bayersdorfer et al. |
| 9,187,034 B2 | 11/2015 | Tarahomi et al. |
| 9,299,887 B2 | 3/2016 | Lowenthal et al. |
| 9,315,148 B2 | 4/2016 | Schwenke et al. |
| 9,452,709 B2 | 9/2016 | Aburto Crespo |
| 9,499,094 B1 | 11/2016 | Dellock et al. |
| 9,568,659 B2 | 2/2017 | Verger et al. |
| 9,616,812 B2 | 4/2017 | Sawayanagi |
| 2002/0159741 A1 | 10/2002 | Graves et al. |
| 2002/0163792 A1 | 11/2002 | Formoso |
| 2003/0167668 A1 | 9/2003 | Kuks et al. |
| 2003/0179548 A1 | 9/2003 | Becker et al. |
| 2004/0213088 A1 | 10/2004 | Fuwausa |
| 2005/0084229 A1 | 4/2005 | Babbitt et al. |
| 2005/0189795 A1 | 9/2005 | Roessler |
| 2006/0087826 A1 | 4/2006 | Anderson, Jr. |
| 2006/0097121 A1 | 5/2006 | Fugate |
| 2006/0261111 A1 * | 11/2006 | McCoy ................. B60R 9/065 224/499 |
| 2007/0032319 A1 | 2/2007 | Tufte |
| 2007/0285938 A1 | 12/2007 | Palmer et al. |
| 2007/0297045 A1 | 12/2007 | Sakai et al. |
| 2008/0205075 A1 | 8/2008 | Hikmet et al. |
| 2009/0217970 A1 | 9/2009 | Zimmerman et al. |
| 2009/0219730 A1 | 9/2009 | Syfert et al. |
| 2009/0251920 A1 | 10/2009 | Kino et al. |
| 2009/0260562 A1 | 10/2009 | Folstad et al. |
| 2009/0262515 A1 | 10/2009 | Lee et al. |
| 2010/0102736 A1 | 4/2010 | Hessling |
| 2010/0206929 A1 * | 8/2010 | Perry ................. B60R 9/06 224/519 |
| 2011/0012062 A1 | 1/2011 | Agrawal et al. |
| 2011/0265360 A1 | 11/2011 | Podd et al. |
| 2012/0001406 A1 | 1/2012 | Paxton et al. |
| 2012/0104954 A1 | 5/2012 | Huang |
| 2012/0183677 A1 | 7/2012 | Agrawal et al. |
| 2012/0280528 A1 | 11/2012 | Dellock et al. |
| 2013/0001609 A1 * | 1/2013 | Ichinose ............. H01L 51/5265 257/89 |
| 2013/0050979 A1 | 2/2013 | Van De Ven et al. |
| 2013/0092965 A1 | 4/2013 | Kijima et al. |
| 2013/0182454 A1 * | 7/2013 | Hofmann ............. B60R 9/10 362/549 |
| 2013/0334559 A1 * | 12/2013 | Vdovin ................. H01L 33/507 257/98 |
| 2013/0335994 A1 | 12/2013 | Mulder et al. |
| 2014/0003044 A1 | 1/2014 | Harbers et al. |
| 2014/0029281 A1 | 1/2014 | Suckling et al. |
| 2014/0065442 A1 | 3/2014 | Kingsley et al. |
| 2014/0103258 A1 | 4/2014 | Agrawal et al. |
| 2014/0211498 A1 | 7/2014 | Cannon et al. |
| 2014/0264396 A1 | 9/2014 | Lowenthal et al. |
| 2014/0266666 A1 | 9/2014 | Habibi |
| 2014/0373898 A1 | 12/2014 | Rogers et al. |
| 2015/0046027 A1 | 2/2015 | Sura et al. |
| 2015/0085488 A1 | 3/2015 | Grote, III et al. |
| 2015/0109602 A1 | 4/2015 | Martin et al. |
| 2015/0138789 A1 | 5/2015 | Singer et al. |
| 2015/0175085 A1 * | 6/2015 | Raley ................. B60R 3/00 224/519 |
| 2015/0267881 A1 * | 9/2015 | Salter ................. H05B 37/0218 362/84 |
| 2015/0307033 A1 | 10/2015 | Preisler et al. |
| 2015/0323149 A1 * | 11/2015 | Salter ................. F21S 43/13 362/510 |
| 2015/0345745 A1 * | 12/2015 | Asadi ................. H01L 33/641 362/84 |
| 2016/0016506 A1 | 1/2016 | Collins et al. |
| 2016/0102819 A1 | 4/2016 | Misawa et al. |
| 2016/0131327 A1 | 5/2016 | Moon et al. |
| 2016/0236613 A1 | 8/2016 | Trier |
| 2016/0240794 A1 | 8/2016 | Yamada et al. |
| 2017/0158125 A1 | 6/2017 | Schuett et al. |
| 2017/0253179 A1 | 9/2017 | Kumada |

(56) References Cited

U.S. PATENT DOCUMENTS

FOREIGN PATENT DOCUMENTS

| | | | |
|---|---|---|---|
| CN | 201193011 Y | | 2/2009 |
| CN | 204127823 U | | 1/2015 |
| CN | 105810840 A | * | 7/2016 |
| DE | 4120677 A1 | | 1/1992 |
| DE | 29708699 U1 | | 7/1997 |
| DE | 10319396 A1 | | 11/2004 |
| EP | 1793261 A1 | | 6/2007 |
| EP | 2778209 A1 | | 9/2014 |
| JP | 2000159011 A | | 6/2000 |
| JP | 2007238063 A | | 9/2007 |
| KR | 20060026531 A | | 3/2006 |
| WO | 2006047306 A1 | | 5/2006 |
| WO | 2014068440 A1 | | 5/2014 |
| WO | 2014161927 A1 | | 10/2014 |

\* cited by examiner

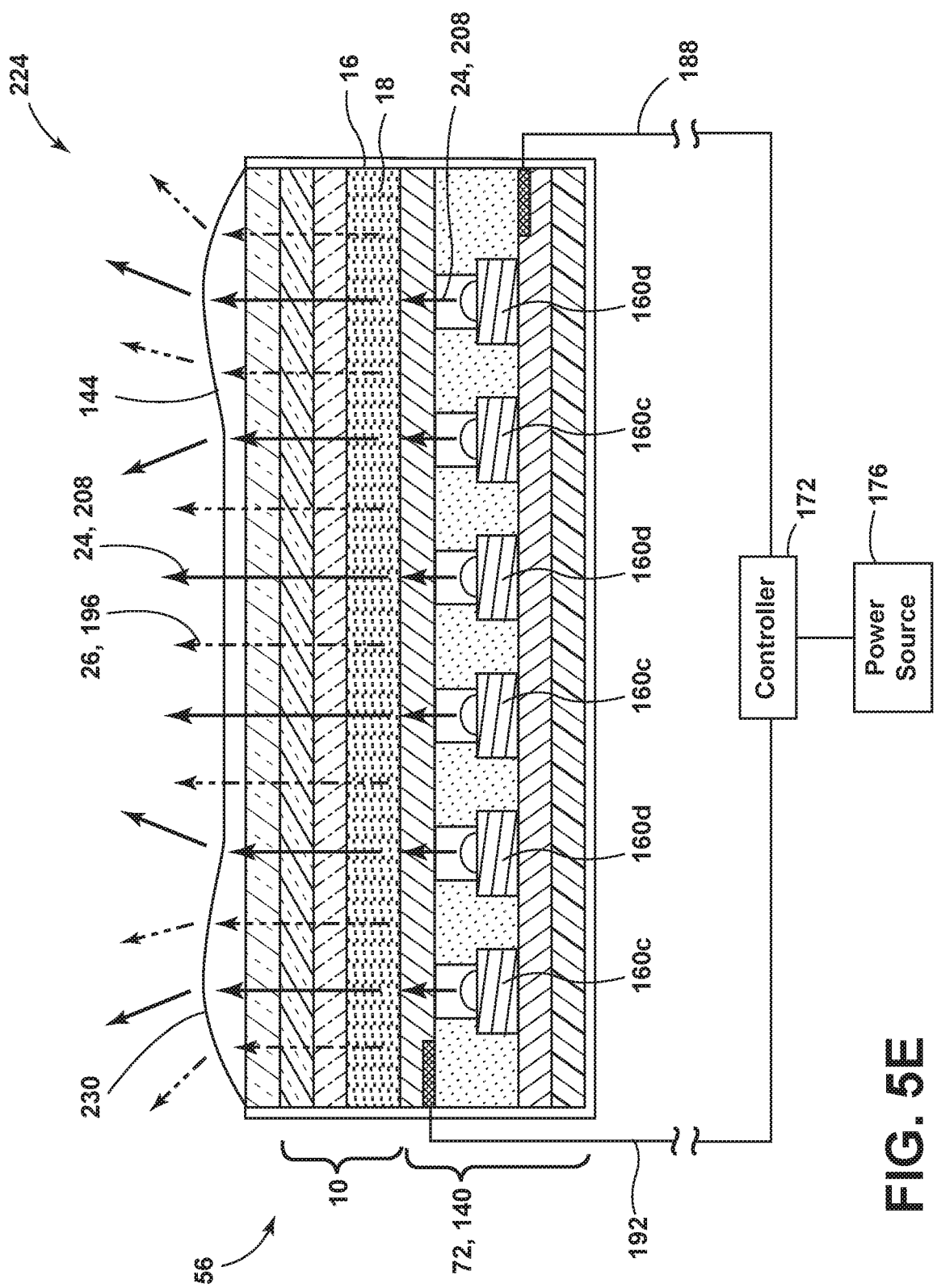

US 10,611,298 B2

ILLUMINATED CARGO CARRIER

FIELD OF THE INVENTION

The present disclosure generally relates to cargo carriers, and more particularly, to illuminated cargo carriers.

BACKGROUND OF THE INVENTION

Illumination arising from the use of photoluminescent structures offers a unique and attractive viewing experience. It is therefore desired to implement such structures in automotive vehicles for various lighting applications.

SUMMARY OF THE INVENTION

According to one aspect of the present disclosure, a cargo carrier includes a housing defining an interior surface and an exterior surface. A light assembly is positioned along the exterior surface. A grate is positioned within the housing. A luminescent structure is positioned on the grate. A light source is positioned on the interior surface and configured to emit light onto the luminescent structure.

According to another aspect of the present disclosure, a vehicle includes a trailer receiver. A cargo carrier is coupled to the trailer receiver. An orientation sensor is configured to detect whether the cargo carrier is in an undeployed or a deployed position. A light assembly is positioned on the cargo carrier and configured to emit light when the cargo carrier is in the deployed position.

According to yet another aspect of the present disclosure, a vehicle includes a cargo area having a support track, a recessed portion and a cargo carrier including a housing. A grate is positioned within the housing and a luminescent structure is positioned on the grate. The cargo carrier is configured to couple with both the support track and the recessed portion.

These and other aspects, objects, and features of the present disclosure will be understood and appreciated by those skilled in the art upon studying the following specification, claims, and appended drawings.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings:

FIG. 5E is an enhanced view taken at section VE of FIG. 4 illustrating an alternate light source having a luminescent structure disposed on the light source configured to convert a portion of light emitted from the light source from a first wavelength to a second wavelength, according to at least one example.

DETAILED DESCRIPTION

Additional features and advantages of the invention will be set forth in the detailed description which follows and will be apparent to those skilled in the art from the description, or recognized by practicing the invention as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions.

Figure 1A:
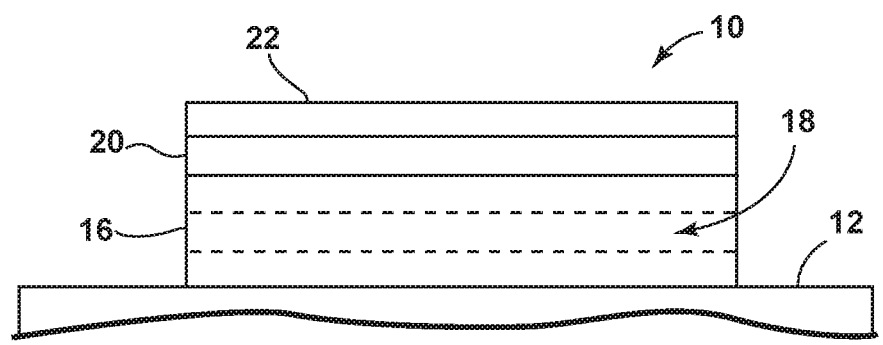
FIG. 1A is a side view of a photoluminescent structure rendered as a coating for use in an assembly according to one embodiment.
Figure 1B:
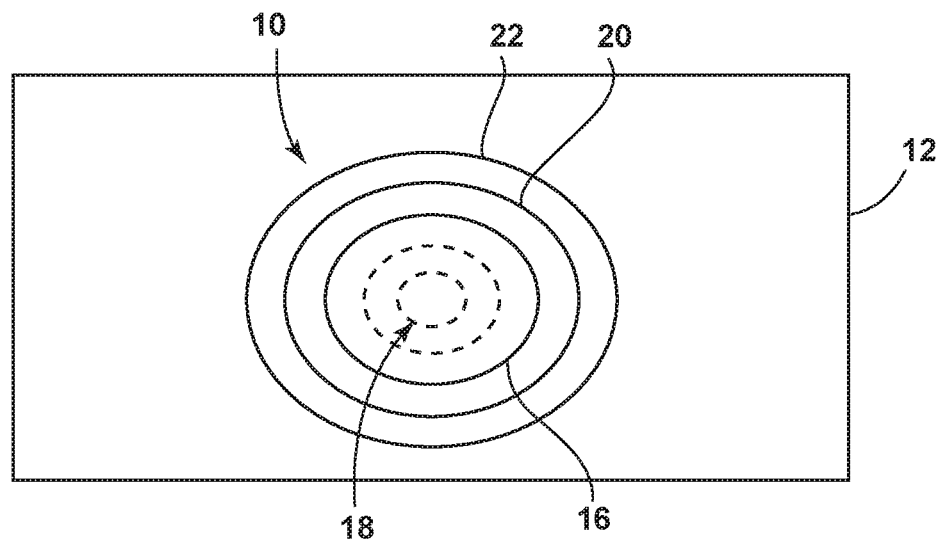
FIG. 1B is a top view of a photoluminescent structure rendered as a discrete particle according to one embodiment.
Figure 1C:
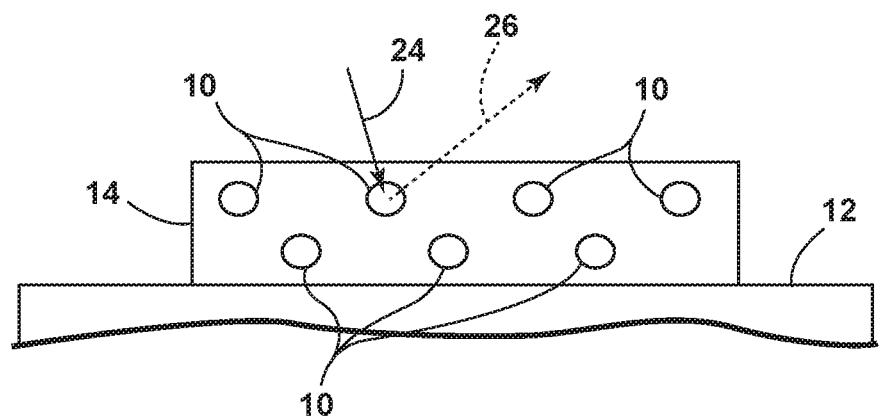
FIG. 1C is a side view of a plurality of photoluminescent structures rendered as discrete particles and incorporated into a separate structure.

Referring to FIGS. 1A-1C, various exemplary embodiments of photoluminescent structures 10 are shown, each capable of being coupled to a substrate 12, which may correspond to a vehicle fixture or vehicle-related piece of equipment. The photoluminescent structures 10 may alternatively known as luminescent structures. In FIG. 1A, the photoluminescent structure 10 is generally shown rendered as a coating (e.g., a film) that may be applied to a surface of the substrate 12. In FIG. 1B, the photoluminescent structure 10 is generally shown as a discrete particle capable of being integrated with a substrate 12. In FIG. 1C, the photoluminescent structure 10 is generally shown as a plurality of discrete particles that may be incorporated into a support medium 14 (e.g., a film) that may then be applied (as shown) or integrated with the substrate 12.

At the most basic level, a given photoluminescent structure 10 includes an energy conversion layer 16 that may include one or more sublayers, which are exemplarily shown through broken lines in FIGS. 1A and 1B. Each sublayer of the energy conversion layer 16 may include one or more photoluminescent materials 18 having energy converting elements with phosphorescent or fluorescent properties. Each photoluminescent material 18 may become excited upon receiving an excitation light 24 of a specific wavelength, thereby causing the light to undergo a conversion process. Under the principle of down conversion, the excitation light 24 is converted into a longer wavelength, converted light 26, that is outputted from the photoluminescent structure 10. Conversely, under the principle of up conversion, the excitation light 24 is converted into a shorter wavelength light that is outputted from the photoluminescent structure 10. When multiple distinct wavelengths of light are outputted from the photoluminescent structure 10 at the same time, the wavelengths of light may mix together and be expressed as a multicolor light.

Light emitted by the sun, ambient sources and/or a light source is referred to herein as excitation light 24 and is illustrated herein as solid arrows. In contrast, light emitted from the photoluminescent structure 10 is referred to herein as converted light 26 and is illustrated herein as broken arrows. The mixture of excitation light 24 and converted light 26 that may be emitted simultaneously is referred to herein as outputted light.

The energy conversion layer 16 may be prepared by dispersing the photoluminescent material 18 in a polymer matrix to form a homogenous mixture using a variety of methods. Such methods may include preparing the energy conversion layer 16 from a formulation in a liquid carrier support medium 14 and coating the energy conversion layer 16 to a desired substrate 12. The energy conversion layer 16 may be applied to a substrate 12 by painting, screen-printing, spraying, slot coating, dip coating, roller coating, and/or bar coating. Alternatively, the energy conversion layer 16 may be prepared by methods that do not use a liquid carrier support medium 14. For example, the energy conversion layer 16 may be rendered by dispersing the photoluminescent material 18 into a solid-state solution (homogenous mixture in a dry state) that may be incorporated in a polymer matrix, which may be formed by extrusion, injection molding, compression molding, calendaring, thermoforming, etc. The energy conversion layer 16 may then be integrated into a substrate 12 using any methods known to those skilled in the art. When the energy conversion layer 16 includes sublayers, each sublayer may be sequentially coated to form the energy conversion layer 16. Alternatively, the sublayers can be separately prepared and later laminated or embossed together to form the energy conversion layer 16. Alternatively still, the energy conversion layer 16 may be formed by coextruding the sublayers.

In some examples, the converted light 26 that has been down converted or up converted may be used to excite other photoluminescent material(s) 18 found in the energy conversion layer 16. The process of using the converted light 26 outputted from one photoluminescent material 18 to excite another, and so on, is generally known as an energy cascade and may serve as an alternative for achieving various color expressions. With respect to either conversion principle, the difference in wavelength between the excitation light 24 and the converted light 26 is known as the Stokes shift and serves as the principal driving mechanism for an energy conversion process corresponding to a change in wavelength of light. In the various embodiments discussed herein, each of the photoluminescent structures 10 may operate under either conversion principle.

Referring back to FIGS. 1A and 1B, the photoluminescent structure 10 may optionally include at least one stability layer 20 to protect the photoluminescent material 18 contained within the energy conversion layer 16 from photolytic and thermal degradation. The stability layer 20 may be configured as a separate layer optically coupled and adhered to the energy conversion layer 16. Alternatively, the stability layer 20 may be integrated with the energy conversion layer 16. The photoluminescent structure 10 may also optionally include a protective layer 22 optically coupled and adhered to the stability layer 20 or other layer (e.g., the conversion layer 16 in the absence of the stability layer 20) to protect the photoluminescent structure 10 from physical and chemical damage arising from environmental exposure. The stability layer 20 and/or the protective layer 22 may be combined with the energy conversion layer 16 through sequential coating or printing of each layer, sequential lamination or embossing, or any other suitable means.

Additional information regarding the construction of photoluminescent structures 10 is disclosed in U.S. Pat. No. 8,232,533 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," the entire disclosure of which is incorporated herein by reference. For additional information regarding fabrication and utilization of photoluminescent materials to achieve various light emissions, refer to U.S. Pat. No. 8,207,511 to Bortz et al., entitled "PHOTOLUMINESCENT FIBERS, COMPOSITIONS AND FABRICS MADE THEREFROM"; U.S. Pat. No. 8,247,761 to Agrawal et al., entitled "PHOTOLUMINESCENT MARKINGS WITH FUNCTIONAL OVERLAYERS"; U.S. Pat. No. 8,519,359 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION"; U.S. Pat. No. 8,664,624 to Kingsley et al., entitled "ILLUMINATION DELIVERY SYSTEM FOR GENERATING SUSTAINED SECONDARY EMISSION"; U.S. Patent Publication No. 2012/0183677 to Agrawal et al., entitled "PHOTOLUMINESCENT COMPOSITIONS, METHODS OF MANUFACTURE AND NOVEL USES"; U.S. Pat. No. 9,057,021 to Kingsley et al., entitled "PHOTOLUMINESCENT OBJECTS"; and U.S. Pat. No. 8,846,184 to Agrawal et al., entitled "CHROMIC LUMINESCENT OBJECTS," all of which are incorporated herein by reference in their entirety.

According to one embodiment, the photoluminescent material 18 may include organic or inorganic fluorescent dyes including rylenes, xanthenes, porphyrins, and phthalocyanines. Additionally, or alternatively, the photoluminescent material 18 may include phosphors from the group of Ce-doped garnets such as YAG:Ce and may be a short persistence photoluminescent material 18. For example, an emission by $Ce^{3+}$ is based on an electronic energy transition from $4D^1$ to $4f^1$ as a parity allowed transition. As a result of this, a difference in energy between the light absorption and the light emission by $Ce^{3+}$ is small, and the luminescent level of $Ce^{3+}$ has an ultra-short lifespan, or decay time, of $10^{-8}$ to $10^{-7}$ seconds (10 to 100 nanoseconds). The decay time may be defined as the time between the end of excitation from the excitation light 24 and the moment when the light intensity of the converted light 26 emitted from the photoluminescent structure 10 drops below a minimum visibility of 0.32 mcd/m². A visibility of 0.32 mcd/m² is roughly 100 times the sensitivity of the dark-adapted human eye, which corresponds to a base level of illumination commonly used by persons of ordinary skill in the art.

According to one embodiment, a $Ce^{3+}$ garnet may be utilized, which has a peak excitation spectrum that may reside in a shorter wavelength range than that of conventional YAG:Ce-type phosphors. Accordingly, $Ce^{3+}$ has short persistence characteristics such that its decay time may be 100 milliseconds or less. Therefore, in some embodiments, the rare earth aluminum garnet type Ce phosphor may serve as the photoluminescent material 18 with ultra-short persistence characteristics, which can emit the converted light 26 by absorbing purple to blue excitation light 24 emitted from a light source and/or ambient sources. According to one embodiment, a ZnS:Ag phosphor may be used to create a blue converted light 26. A ZnS:Cu phosphor may be utilized to create a yellowish-green converted light 26. A $Y_2O_2S$:Eu phosphor may be used to create red converted light 26. Moreover, the aforementioned phosphorescent materials may be combined to form a wide range of colors, including white light. It will be understood that any short persistence photoluminescent material known in the art may be utilized without departing from the teachings provided herein. Additional information regarding the production of short persistence photoluminescent materials is disclosed in U.S. Pat. No. 8,163,201 to Agrawal et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," the entire disclosure of which is incorporated herein by reference.

Additionally, or alternatively, the photoluminescent material 18, according to one embodiment, disposed within the photoluminescent structure 10 may include a long persistence photoluminescent material 18 that emits the converted light 26 once charged by the excitation light 24. The excitation light 24 may be emitted from any excitation source (e.g., any natural light source, such as the sun, and/or any artificial light source). The long persistence photoluminescent material 18 may be defined as having a long decay time due to its ability to store the excitation light 24 and release the converted light 26 gradually, for a period of several minutes or hours, once the excitation light 24 is no longer present.

The long persistence photoluminescent material 18, according to one embodiment, may be operable to emit light at or above an intensity of 0.32 $mcd/m^2$ after a period of 10 minutes. Additionally, the long persistence photoluminescent material 18 may be operable to emit light above or at an intensity of 0.32 $mcd/m^2$ after a period of 30 minutes and, in some embodiments, for a period substantially longer than 60 minutes (e.g., the period may extend 24 hours or longer, and in some instances, the period may extend 48 hours). Accordingly, the long persistence photoluminescent material 18 may continually illuminate in response to excitation from any light sources that emits the excitation light 24, including, but not limited to, natural light sources (e.g., the sun) and/or any artificial light source. The periodic absorption of the excitation light 24 from any excitation source may provide for a substantially sustained charge of the long persistence photoluminescent material 18 to provide for consistent passive illumination. In some embodiments, a light sensor may monitor the illumination intensity of the photoluminescent structure 10 and actuate an excitation source when the illumination intensity falls below 0.32 $mcd/m^2$, or any other predefined intensity level.

The long persistence photoluminescent material 18 may correspond to alkaline earth aluminates and silicates, for example doped di-silicates, or any other compound that is capable of emitting light for a period of time once the excitation light 24 is no longer present. The long persistence photoluminescent material 18 may be doped with one or more ions, which may correspond to rare earth elements, for example, $Eu^{2+}$, $Tb^{3+}$ and/or $Dy^3$. According to one non-limiting exemplary embodiment, the photoluminescent structure 10 includes a phosphorescent material in the range of about 30% to about 55%, a liquid carrier medium in the range of about 25% to about 55%, a polymeric resin in the range of about 15% to about 35%, a stabilizing additive in the range of about 0.25% to about 20%, and performance-enhancing additives in the range of about 0% to about 5%, each based on the weight of the formulation.

The photoluminescent structure 10, according to one embodiment, may be a translucent white color, and in some instances reflective, when unilluminated. Once the photoluminescent structure 10 receives the excitation light 24 of a particular wavelength, the photoluminescent structure 10 may emit any color light (e.g., blue or red) therefrom at any desired brightness. According to one embodiment, a blue-emitting phosphorescent material may have the structure $Li_2ZnGeO_4$ and may be prepared by a high temperature solid-state reaction method or through any other practicable method and/or process. The afterglow may last for a duration of 2-8 hours and may originate from the excitation light 24 and d-d transitions of $Mn^{2+}$ ions.

According to an alternate non-limiting exemplary embodiment, 100 parts of a commercial solvent-borne polyurethane, such as Mace resin 107-268, having 50% solid polyurethane in toluene/isopropanol, 125 parts of a blue-green long persistence phosphor, such as Performance Indicator PI-BG20, and 12.5 parts of a dye solution containing 0.1% Lumogen Yellow F083 in dioxolane may be blended to yield a low rare earth mineral photoluminescent structure 10. It will be understood that the compositions provided herein are non-limiting examples. Thus, any phosphor known in the art may be utilized within the photoluminescent structure 10 without departing from the teachings provided herein. Moreover, it is contemplated that any long persistence phosphor known in the art may also be utilized without departing from the teachings provided herein.

Additional information regarding the production of long persistence photoluminescent materials is disclosed in U.S. Pat. No. 8,163,201 to Agrawal et al., entitled "HIGH-INTENSITY, PERSISTENT PHOTOLUMINESCENT FORMULATIONS AND OBJECTS, AND METHODS FOR CREATING THE SAME," the entire disclosure of which is incorporated herein by reference. For additional information regarding long persistence phosphorescent structures, refer to U.S. Pat. No. 6,953,536 to Yen et al., entitled "LONG PERSISTENT PHOSPHORS AND PERSISTENT ENERGY TRANSFER TECHNIQUE"; U.S. Pat. No. 6,117,362 to Yen et al., entitled "LONG-PERSISTENT BLUE PHOSPHORS"; and U.S. Pat. No. 8,952,341 to Kingsley et al., entitled "LOW RARE EARTH MINERAL PHOTOLUMINESCENT COMPOSITIONS AND STRUCTURES FOR GENERATING LONG-PERSISTENT LUMINESCENCE," all of which are incorporated herein by reference in their entirety.

Referring now to FIGS. 2A-4, reference numeral 40 generally designates a vehicle. The vehicle 40 includes a cargo area 44. The cargo area 44 includes a support track 48 and a recessed portion 52. A cargo carrier 56 includes a housing 60 defining an interior surface 64 and an exterior surface 68. A light assembly 72 is positioned along the exterior surface 68. A grate 76 is positioned within the housing 60. The photoluminescent structure 10 is positioned on the grate 76. A light source 80 is positioned on the interior surface 64 and is configured to emit light onto the photoluminescent structure 10. The cargo carrier 56 may be configured to couple with both the support track 48 and the recessed portion 52.

Figure 2A:
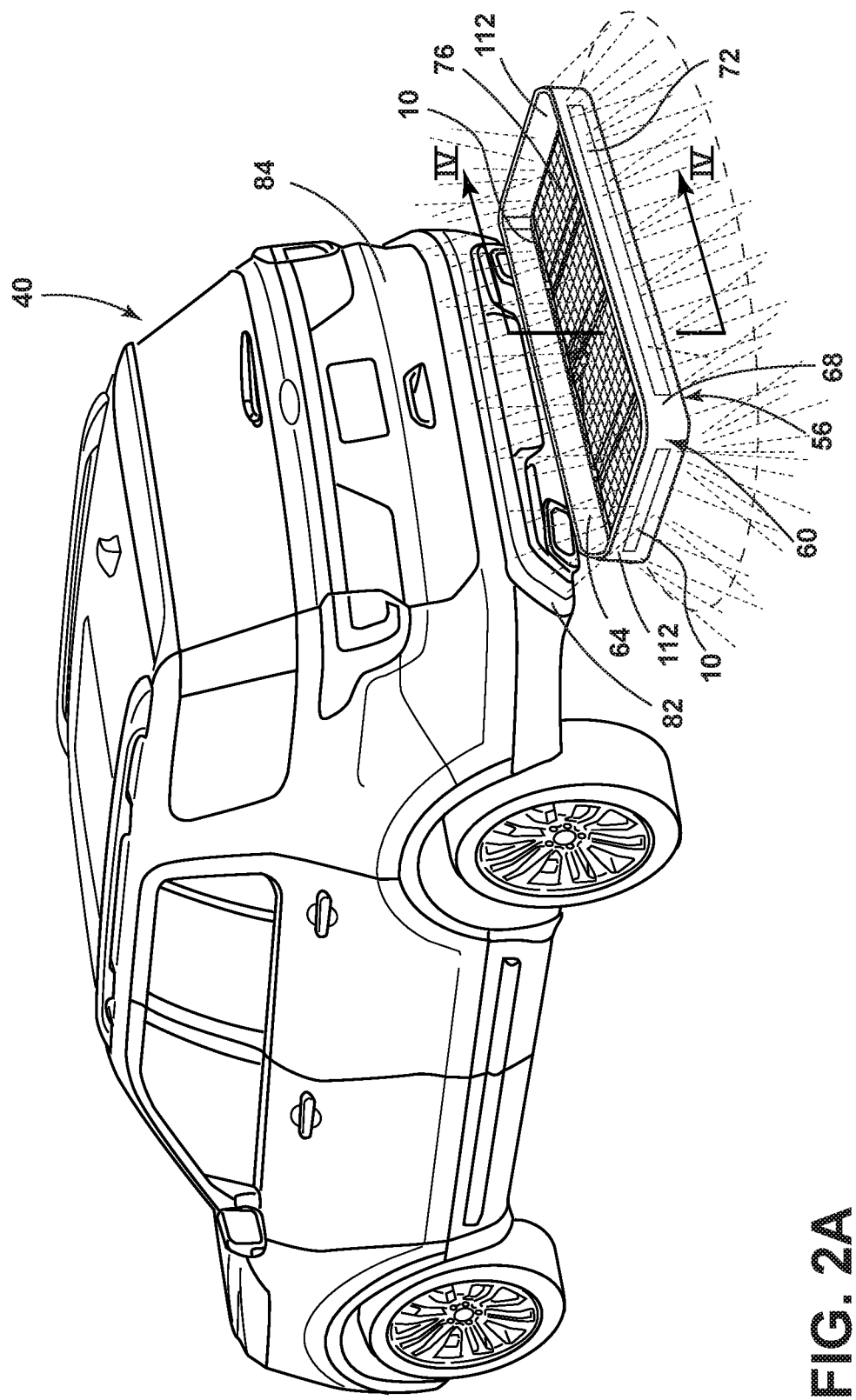
FIG. 2A is a rear perspective of a vehicle, according to at least one example.
Figure 2B:
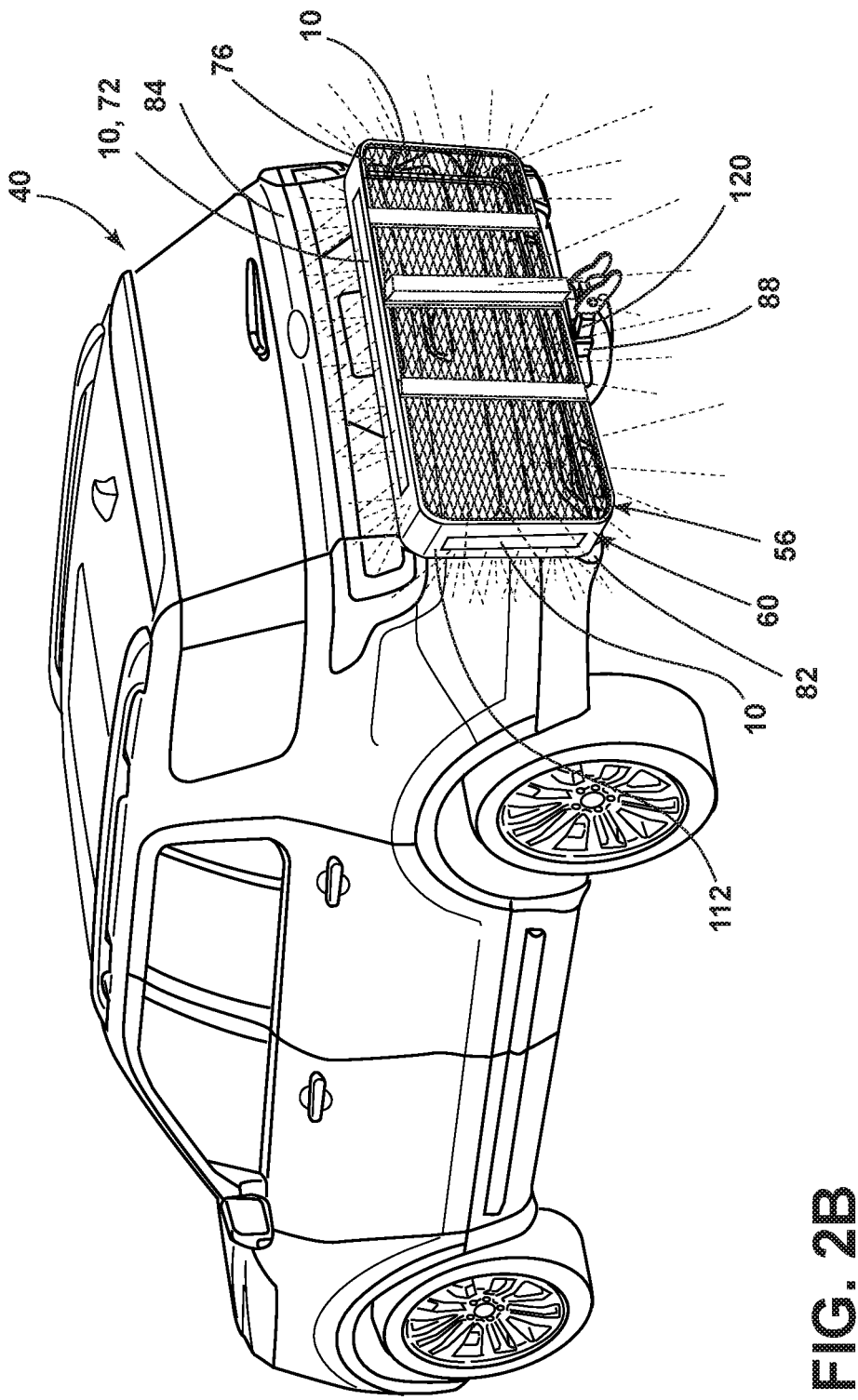
FIG. 2B is a rear perspective of a vehicle, according to at least one example.
Figure 3A:
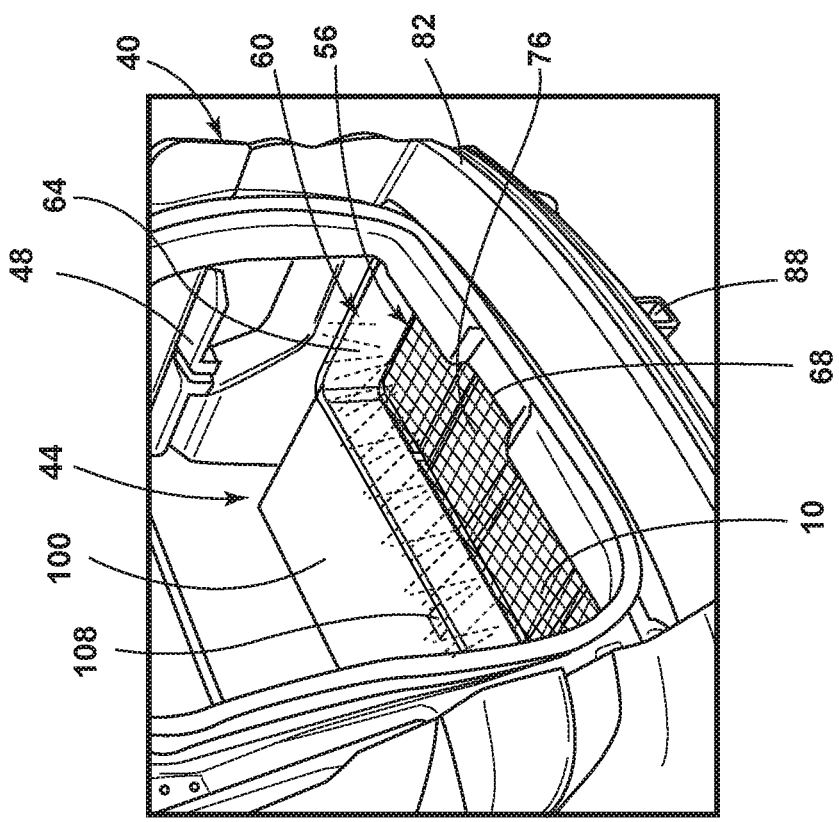
FIG. 3A is a perspective view of a vehicle interior, according to at least one example.
Figure 3B:
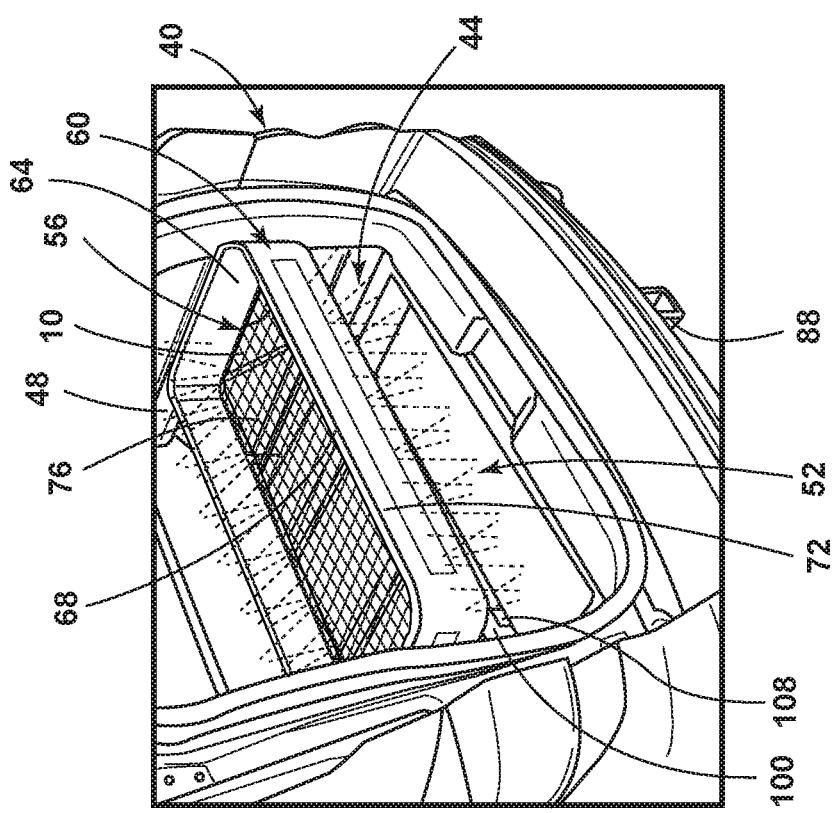
FIG. 3B is a perspective view of a vehicle interior, according to at least one example.

Referring now to FIGS. 2A and 2B, a rear portion of the vehicle 40 includes a bumper 82 and a lift gate 84. The lift gate 84 is operable between a closed position (FIGS. 2A and 2B) and an open position (FIGS. 3A and 3B). In the open position, the lift gate 84 permits access to the cargo area 44. In the closed position, the lift gate 84 securely retains cargo within the vehicle 40. A trailer receiver 88 is coupled to the bumper 82. A trailer electrical mount 92 (FIG. 4) is positioned proximate the trailer receiver 88. The trailer electrical mount 92 is configured to provide electrical power and transmit signals to the cargo carrier 56.

The cargo carrier 56 is configured to hold cargo on an exterior of the vehicle 40. The cargo carrier 56 is operable between deployed (FIG. 2A) and undeployed (FIG. 2B) positions. In the deployed position, the cargo carrier 56 is substantially horizontal and extends in an outward direction from the vehicle 40. In the undeployed position, the cargo carrier 56 may be in a substantially vertical orientation. Transitioning of the cargo carrier 56 to the undeployed position allows for a more compact storing of the cargo carrier 56. In other words, the undeployed position allows the cargo carrier 56 to fold toward the lift gate 84 such that an overall length of the vehicle 40 is decreased.

Referring now to FIGS. 3A and 3B, the cargo carrier 56 is configured to be positioned within the cargo area 44. The cargo area 44 includes the support track 48 and the recessed portion 52. The cargo area 44 further includes a cargo floor 100. The support track 48 includes both driver side and passenger side supports. The support track 48 is configured to support the cargo carrier 56 above the recessed portion 52 and the cargo floor 100. In other words, the support track 48 is configured to support the cargo carrier 56 as a shelf within the cargo area 44. The support track 48 may include one or more locking features configured to engage the cargo carrier 56 and secure the cargo carrier 56 in place. Further, the support track 48 may be configured to support the cargo carrier 56 in a vertical orientation. Such a feature may be advantageous in allowing the cargo carrier 56 to function as a cargo grate (e.g., a divider between the cargo area 44 and passengers) to prevent cargo in the cargo area 44 from moving forward toward occupants. In such an example, the locking features may be configured to hold the cargo carrier 56 in place.

The recessed portion 52 is defined in the cargo floor 100. The recessed portion 52 may be a shallow pan in the cargo floor 100. The cargo floor 100 may define a single or a plurality of recessed portions 52. The recessed portion 52 may have a depth approximately equal to that of the cargo carrier 56. The depth may vary across the length and/or width of the recessed portion 52. The recessed portion 52 is sized and shaped to mate with, or receive, the cargo carrier 56. When the cargo carrier 56 is positioned within the recessed portion 52, the housing 60 and/or grate 76 may be substantially flush with the cargo floor 100. As such, the cargo carrier 56 may be capable of supporting or storing cargo while positioned within the recessed portion 52. Further, a cavity may be defined between a floor of the recessed portion 52 and the cargo carrier 56 such that objects and items may be stored within the recessed portion 52 at the same time as the cargo carrier 56.

An electrical connection 108 may be positioned within the cargo floor 100 around a perimeter of the recessed portion 52. The electrical connection 108 is configured to electrically couple with the cargo carrier 56. Electrical coupling between the electrical connection 108 and the cargo carrier 56 allows for the powering of the light assembly 72 and the light sources 80 while the cargo carrier 56 is positioned within the recessed portion 52. The electrical connection 108 may be a pogo pin connector, a metal contact and/or other types of connections configured to provide electrical power to the cargo carrier 56. Additionally or alternatively, the support track 48 may include a structure substantially similar in function and/or design to power the cargo carrier 56. As will be explained in greater detail below, electrically powering the cargo carrier 56 while in carrier 56 is within the cargo area 44 may be advantageous in providing ambient and/or task lighting within the vehicle 40.

Figure 4:
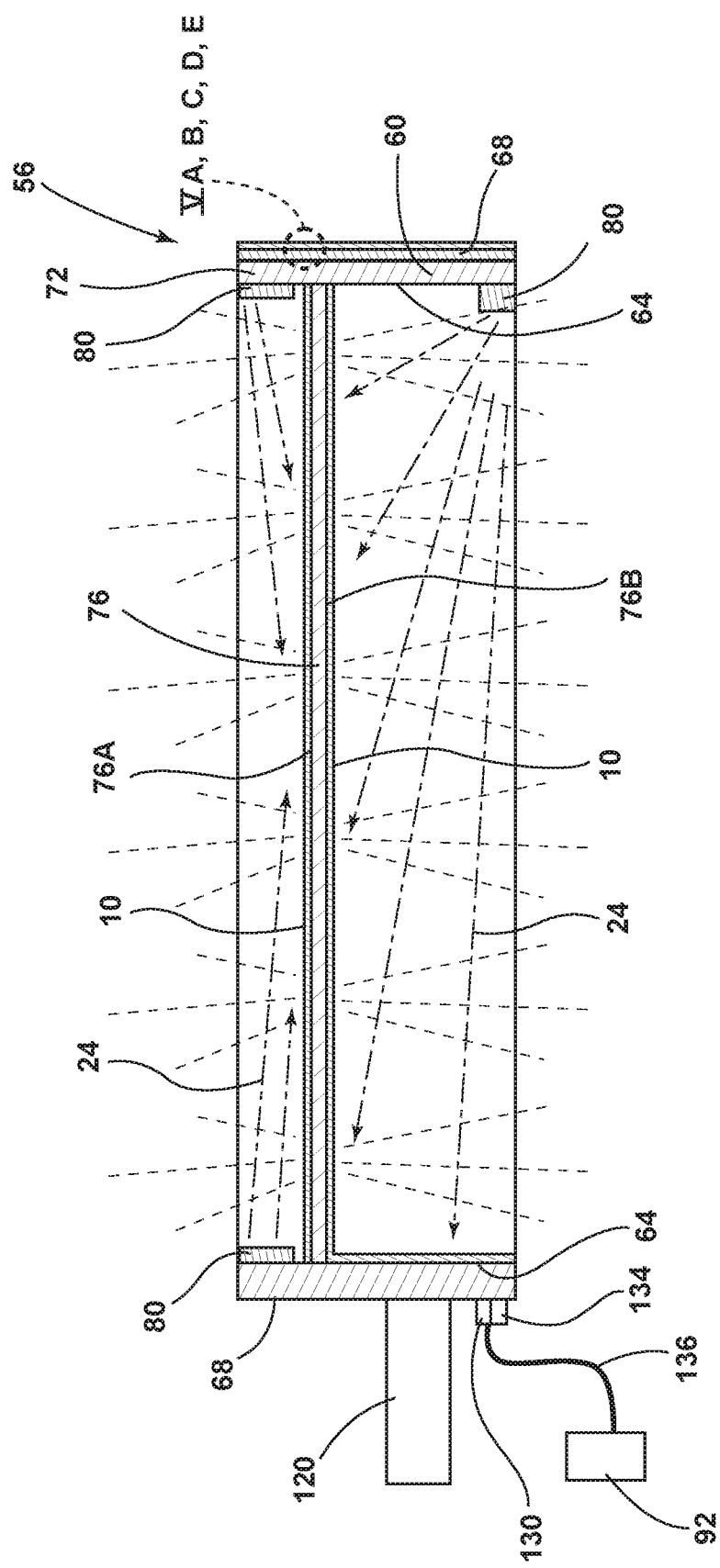
FIG. 4 is a cross-sectional view taken at line IV of FIG. 2A, according to at least one example.

Referring now to FIG. 4, the housing 60 may extend around a portion, a majority or an entirety of a perimeter of the cargo carrier 56. The housing 60 may be formed of a metal, polymeric material and/or combinations thereof. The housing 60 defines the interior surface 64 and the exterior surface 68. A portion of the exterior surface 68 may correspond to a vehicle rear surface when the cargo carrier 56 is in the deployed position. The housing 60 may further define one or more side walls 112 (FIGS. 2A and 2B). The housing 60 may extend on only one side, or both sides, of the grate 76. For example, the housing 60 may extend on both sides of the grate 76 over a portion, a majority or an entirety of a perimeter of the cargo carrier 56. According to various examples, a portion, a majority or an entirety of the grate 76 may be substantially flush with a top surface of the housing 60.

A trailer mount 120 may be coupled with the cargo carrier 56. The trailer mount 120 may be coupled to the grate 76 and/or to the housing 60. The trailer mount 120 extends in a vehicle forward direction to couple with the trailer receiver 88. In other words, the trailer mount 120 and cargo carrier 56 may be supported and/or carried by the trailer receiver 88. The trailer mount 120 may be circular, square, rectangular and/or higher order polygons. The trailer mount 120 may be configured to slide into, or be received by, the trailer receiver 88. The trailer mount 120 may include a hinge and/or be coupled with a hinge. Incorporation of a hinge may allow the cargo carrier 56 to pivot and/or rotate between the deployed and undeployed positions.

The grate 76 is positioned within the housing 60 of the cargo carrier 56. The grate 76 may be composed of a metal, polymer, ceramic and/or combinations thereof. The grate 76 is depicted as in the middle of the housing 60, but it will be understood that the grate 76 may be positioned at the top or bottom of the housing 60 or any position therebetween. Although depicted as including a single grate 76, it will be understood that the cargo carrier 56 may include a plurality of grates 76. The grate 76 may be a mesh and/or may be a plate having a plurality of holes disposed therethrough. Additionally or alternatively, the grate 76 may be a solid plate. The grate 76 defines a first surface 76A and a second surface 76B.

The photoluminescent structure 10 may be positioned on the first surface 76A and/or the second surface 76B. In a specific example, the grate 76 defines the first surface 76A and the second surface 76B and the photoluminescent structure 10 is positioned on both the first and second surfaces 76A, 76B. It will be understood that where holes or openings are present within the grate 76, the photoluminescent structure 10 may extend therethrough. In other words, photoluminescent structures 10 on the first and second grate surfaces 76A, 76B may be tied, or linked, through the grate 76. The photoluminescent structures 10 on the first and second surfaces 76A, 76B may be the same (e.g., configured to be excited by the same light and/or emit the same light) or may be different (e.g., configured to be excited by a different light and/or emit a different light). The photoluminescent structure 10 may be applied as a single continuous coating, a striping, a discontinuous pattern (e.g., stippling) and/or combinations thereof to the first and/or second surfaces 76A, 76B. Further, the photoluminescent structure 10 may be configured as an indicium or indicia. The photoluminescent structure 10 on either the first or second surfaces 76A, 76B may extend onto and/or be positioned on the interior surface 64 of the housing 60. It will be understood that although depicted as a single continuous structure, the photoluminescent structure positioned on either the first or second surface 76A, 76B and the interior surface 64 may be separate structures without departing from the teachings provided herein. Further, the cargo carrier 56 may include one or more photoluminescent structures 10 positioned on the exterior surfaces 68 of the side walls 112 (FIGS. 2A and 2B). In such an example, the photoluminescent structures 10 may be configured to emit light in a vehicle outward direction. As such, the photoluminescent structures 10 may function as side markers for the cargo carrier 56. In such an example, the photoluminescent structure may be configured to emit amber colored light and/or include a long persistence phosphor. It will be understood that the sidewalls 112 may include one or more light producing structures to power and/or excite the photoluminescent structures 10 without departing from the teachings provided herein. The photoluminescent structure 10 positioned on the grate 76 may be configured to emit red light when excited to indicate braking. Further, the photoluminescent structure 10 may include a persistent phosphor material such that the photoluminescent structure 10 may emit light for an extend period of time.

One or more light sources 80 may be positioned on the interior surface 64 of the housing 60. In the depicted example, two light sources 80 are positioned above the grate 76 and one below, but it will be understood that any number of light sources 80 may be positioned above or below the grate 76 without departing from the teachings provided herein. In the depicted example, a first light source 80 is positioned proximate the first surface 76A of the grate 76 and a second light source 80 is positioned proximate the second surface 76B of the grate 76. The light sources 80 may be configured to emit white, colored, visible and/or non-visible light. For example, the light sources 80 may be configured to emit the excitation light 24 to excite the photoluminescent structures 10. The positioning of the light sources 80 allows the emitted light to wash over the photoluminescent structures 10 while in the deployed or undeployed positions. For example, the light source 80 positioned proximate the second side 76B of the grate 76 is positioned such that when the cargo carrier 56 is in the undeployed position, the excitation light 24 washes over the photoluminescent structure 10 such that light is emitted in a rearward direction from the vehicle 40. The light sources 80 may include overmolded optics to spread and/or concentrate the excitation light 24. As will be explained in greater detail below, such a large illuminated area may be advantageous in increasing the visibility of the vehicle 40 at night as well as while braking. Further, positioning of the light source(s) 80 above the grate 76 may allow for light emitted from the photoluminescent structure 10 to wash over the rear (e.g., the lift gate 84) of the vehicle 40. It will be understood that the above noted disclosure related to the light sources 80 may be equally applied to a light source positioned on the rear of the vehicle 40 and configured to emit the excitation light 24 onto the photoluminescent structure 10 on the grate 76.

A sensor 130 may be configured to detect an orientation (e.g., deployed or undeployed) of the cargo carrier 56. The sensor 130 may be positioned on the cargo carrier 56 and/or on the rear (e.g., lift gate 84, bumper 82, etc.) of the vehicle 40. In examples where the sensor 130 is positioned on the rear of the vehicle 40, the sensor 130 may include a proximity sensor, a capacitive sensor, a light sensor, an imager, other sensors configured to detect the proximity of the cargo carrier 56 (e.g., in the vertical undeployed position) and combinations thereof. In examples where the sensor 130 is position on the cargo carrier 56, the sensor 130 may be overmolded onto the interior or exterior surfaces 64, 68 of the housing 60. In examples where the sensor 130 is positioned on the cargo carrier 56, the sensor 130 may include an accelerometer, gyroscope, magnetometer and/or other sensors configured to detect the orientation of the cargo carrier 56. In examples where the sensor 130 is coupled with the cargo carrier 56, an electrode 134 may be co-molded with the sensor 130. The electrode 134 may take a variety of configurations to power the cargo carrier 56 such as connector pins and the like. The electrode 134 may include one or more electrical cables 136 configured to electrically couple with the trailer electrical mount 92. As such, the trailer electrical mount 92 may provide power and control to the cargo carrier 56. Further, the electrical cables 136 may allow the sensor 130 to be coupled with the trailer electrical mount 92.

The light assembly 72 is positioned on the vehicle rear surface of the exterior surface 68. The light assembly 72 is configured to illuminate in a vehicle rearward direction and/or downward onto a ground positioned beneath the cargo carrier 56. The light assembly 72 may extend across a portion, a majority or an entirety of the vehicle rear surface. Further, the light assembly 72 may extend onto the side walls 112. In such examples, the light assembly 72 may cooperate with the photoluminescent portions located on the side walls 112.

Figure 5A:
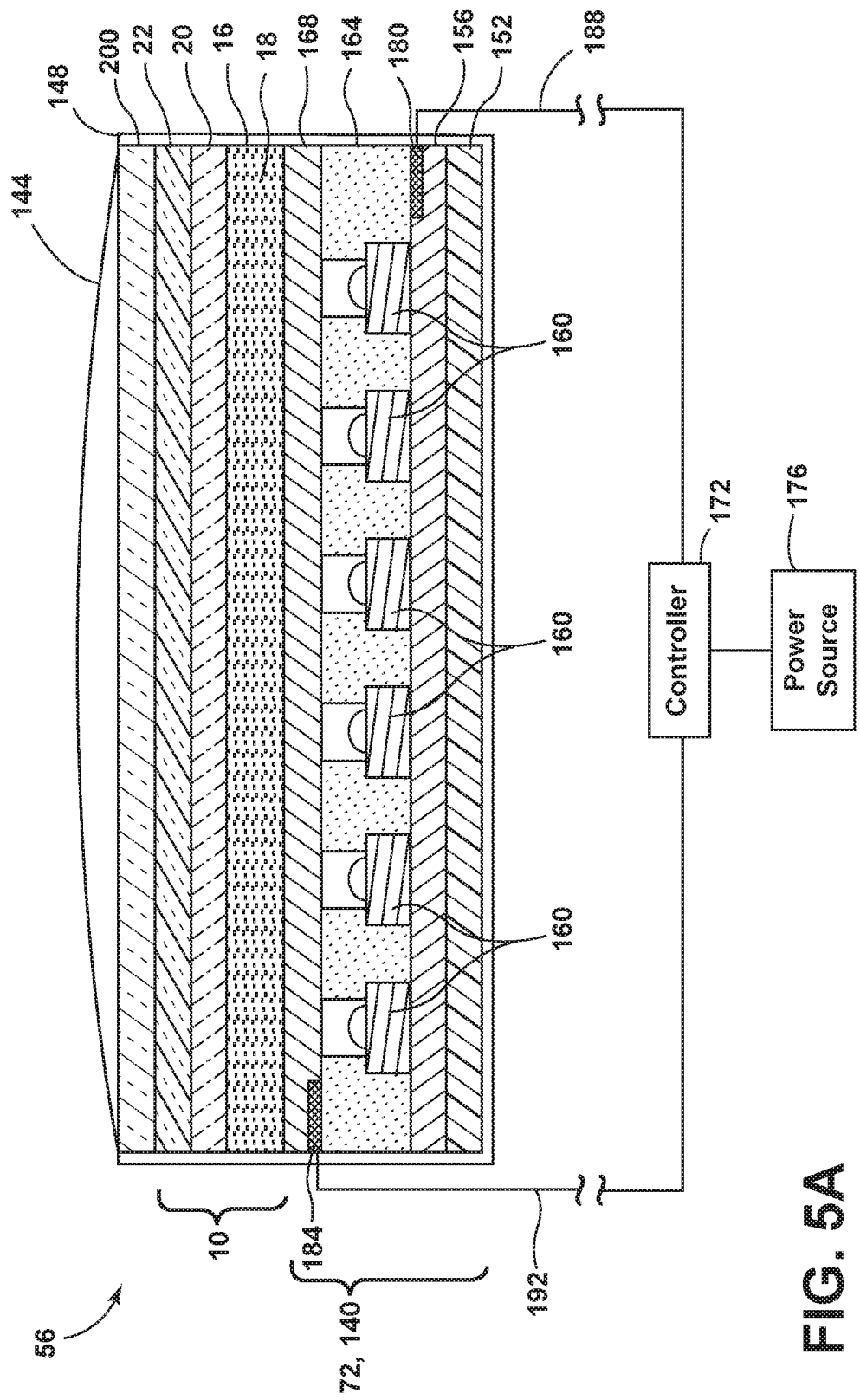
FIG. 5A is an enhanced view taken at section VA of FIG. 4 illustrating a light assembly according to at least one example.

Referring to FIGS. 5A-5E, a cross-sectional view of the light assembly 72 is shown, according to various embodiments. It will be understood that the disclosure provided below may equally be applied to the auxiliary the light sources 80 or other illuminating structures around the vehicle 40 (e.g., examples of the photoluminescent structure 10 including a light) without departing from the teachings provided herein. As illustrated in FIG. 5A, the light assembly 72 may have a stacked arrangement that includes a light-producing assembly 140, the photoluminescent structure 10, a viewable portion 144, and an overmold material 148. It will be understood that the viewable portion 144 and the overmold material 148 may be two separate components, or may be integrally formed as a single component. Further, it will be understood that the light-producing assembly 140 may be the same structure as the light assembly 72.

Referring now to FIG. 5A, the light-producing assembly 140 may correspond to a thin-film or printed light emitting diode (LED) assembly and includes a substrate 152 as its lowermost layer. The substrate 152 may include a polycarbonate, poly-methyl methacrylate (PMMA), or polyethylene terephthalate (PET) material on the order of 0.005 to 0.060 inches thick and is arranged over the intended vehicle substrate 152 on which the light assembly 72 is to be received. Alternatively, as a cost saving measure, the substrate 152 may directly correspond to a preexisting structure.

The light-producing assembly 140 includes a positive electrode 156 arranged over the substrate 152. The positive electrode 156 includes a conductive epoxy such as, but not limited to, a silver-containing or copper-containing epoxy. The positive electrode 156 is electrically connected to at least a portion of a plurality of LED sources 160 arranged within a semiconductor ink 164 and applied over the positive electrode 156. Likewise, a negative electrode 168 is also electrically connected to at least a portion of the LED sources 160. The negative electrode 168 is arranged over the semiconductor ink 164 and includes a transparent or translucent conductive material such as, but not limited to, indium tin oxide. Additionally, each of the positive and negative electrodes 156, 168 are electrically connected to a controller 172 and a power source 176 via a corresponding bus bar 180, 184 and conductive leads 188, 192. The bus bars 180, 184 may be printed along opposite edges of the positive and negative electrodes 156, 168 and the points of connection between the bus bars 180, 184 and the conductive leads 188, 192 may be at opposite corners of each bus bar 180, 184 to promote uniform current distribution along the bus bars 180, 184. It should be appreciated that in alternate examples, the orientation of components within the light-producing assembly 140 may be altered without departing from the concepts of the present disclosure. For example, the negative electrode 168 may be disposed below the semiconductor ink 164 and the positive electrode 156 may be arranged over the aforementioned semiconductor ink 164. Likewise, additional components, such as the bus bars 180, 184, may also be placed in any orientation such that the light-producing assembly 140 may emit outputted light 196 (FIG. 5B) towards a desired location.

The LED sources 160 may be dispersed in a random or controlled fashion within the semiconductor ink 164 and may be configured to emit focused or non-focused light toward the photoluminescent structure 10. The LED sources 160 may correspond to micro-LEDs of gallium nitride elements on the order of about 5 to about 400 microns in size and the semiconductor ink 164 may include various binders and dielectric materials including, but not limited to, one or more of gallium, indium, silicon carbide, phosphorous, and/or translucent polymeric binders.

The semiconductor ink 164 can be applied through various printing processes, including ink jet and silk screen processes to selected portion(s) of the positive electrode 156. More specifically, it is envisioned that the LED sources 160 are dispersed within the semiconductor ink 164, and shaped and sized such that a substantial quantity of the LED sources 160 align with the positive and negative electrodes 156, 168 during deposition of the semiconductor ink 164. The portion of the LED sources 160 that ultimately are electrically connected to the positive and negative electrodes 156, 168 may be illuminated by a combination of the bus bars 180, 184, controller 172, power source 176, and conductive leads 188, 192. According to one embodiment, the power source 176 may correspond to a vehicular power source 176 operating at 12 to 16 VDC. Additional information regarding the construction of light-producing assemblies 140 is disclosed in U.S. Patent Publication No. 2014/0264396 A1 to Lowenthal et al. entitled "ULTRA-THIN PRINTED LED LAYER REMOVED FROM SUBSTRATE," filed Mar. 12, 2014, the entire disclosure of which is incorporated herein by reference.

Referring still to FIG. 5A, the photoluminescent structure 10 is arranged over the negative electrode 168 as a coating, layer, film or other suitable deposition. With respect to the presently illustrated embodiment, the photoluminescent structure 10 may be arranged as a multi-layered structure including an energy conversion layer 16, optional stability layer 20, and optional protective layer 22, as described above.

The viewable portion 144 is arranged over the photoluminescent structure 10. In some embodiments, the viewable portion 144 may include a plastic, silicon, or urethane material and is molded over the photoluminescent structure 10 and light-producing assembly 140. Preferably, the viewable portion 144 should be at least partially light transmissible. In this manner, the viewable portion 144 will be illuminated by the photoluminescent structure 10 whenever an energy conversion process is underway. Additionally, by over-sealing the viewable portion 144, it may also function to protect the photoluminescent structure 10 and the light-producing assembly 140. The viewable portion 144 may be arranged in a planar shape and/or an arcuate shape to enhance its viewing potential. Like the photoluminescent structure 10 and the light-producing assembly 140, the viewable portion 144 may also benefit from a thin design, thereby helping to fit the light assembly 72 into small package spaces of the vehicle 40.

In some embodiments, a decorative layer 200 may be disposed between the viewable portion 144 and the photoluminescent structure 10. The decorative layer 200 may include a polymeric material or other suitable material and is configured to control or modify an appearance of the viewable portion 144. For example, the decorative layer 200 may be configured to confer an appearance of a trim component (e.g., metallic) to the viewable portion 144 when the viewable portion 144 is in an unilluminated state. In other embodiments, the decorative layer 200 may be tinted any color to complement the vehicle 40. In any event, the decorative layer 200 should be at least partially light transmissible such that the photoluminescent structure 10 is not prevented from illuminating the viewable portion 144 whenever an energy conversion process is underway.

The overmold material 148 is disposed around the light-producing assembly 140 and/or photoluminescent structure 10. The overmold material 148 may protect the light-producing assembly 140 from physical and chemical damage arising from environmental exposure. The overmold material 148 may have viscoelasticity (i.e., having both viscosity and elasticity), a low Young's modulus, and/or a high failure strain compared with other materials, so that the overmold material 148 may protect the light-producing assembly 140 when contact is made thereto. For example, the overmold material 148 may protect the light-producing assembly 140 from the environmental containments, such as dirt and water, that may come in contact with the vehicle 40. It is also contemplated that the viewable portion 144 may be formed by a portion of the overmold material 148. In some embodiments, the photoluminescent structure 10 may be employed separate and away from the light-producing assembly 140.

Figure 5B:
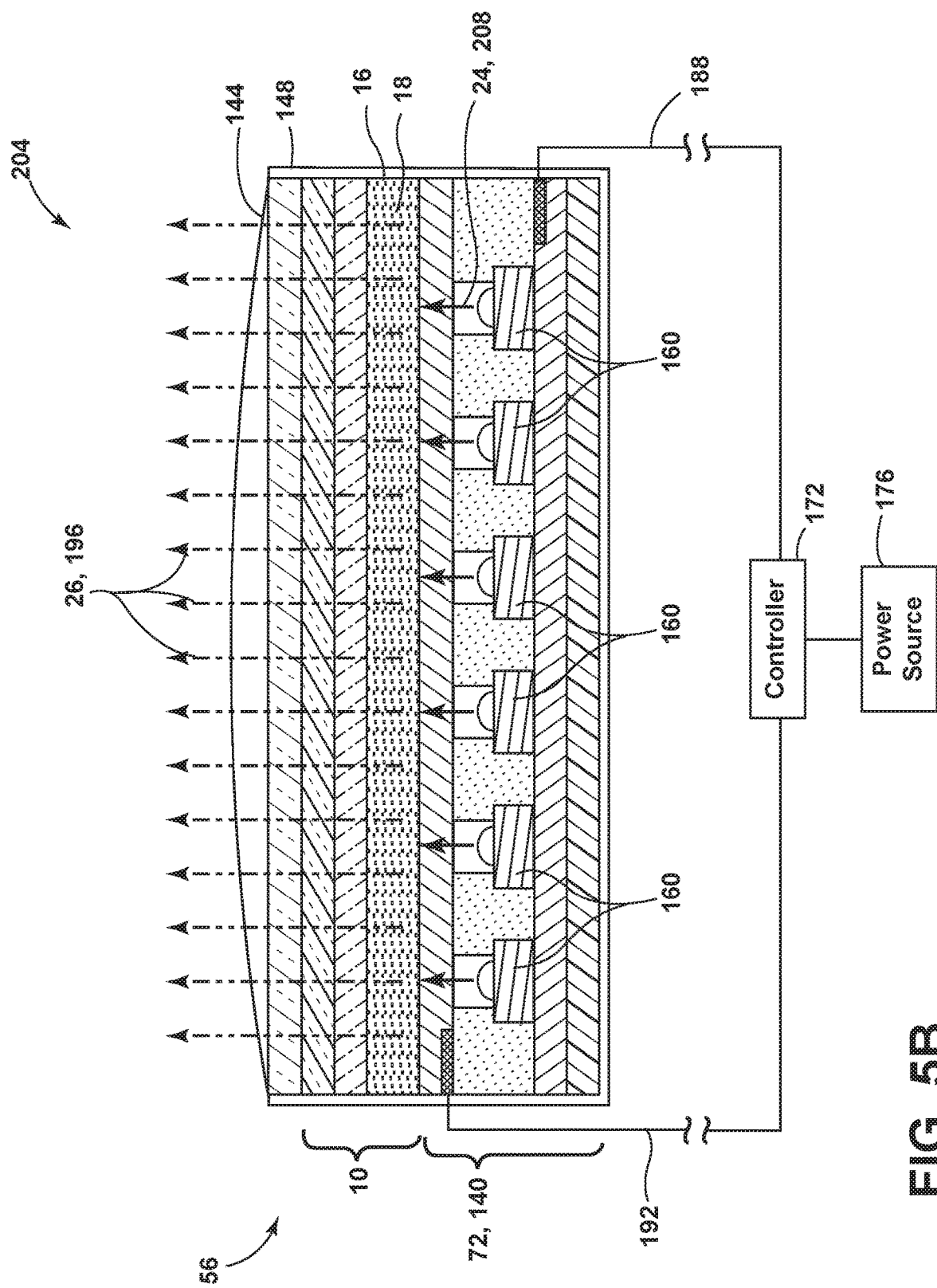
FIG. 5B is an enhanced view taken at section VB of FIG. 4 further illustrating the light assembly, according to at least one example.

Referring now to FIG. 5B, an energy conversion process 204 for producing single color luminescence is illustrated, according to one embodiment. For purposes of illustration, the energy conversion process 204 is described below using the example of the light assembly 72 depicted in FIG. 5A. In this embodiment, the energy conversion layer 16 of the photoluminescent structure 10 includes a single photoluminescent material 18, which is configured to convert inputted light 208 received from LED sources 160 into an outputted light 196 having a wavelength different than that associated with the inputted light 208. More specifically, the photoluminescent material 18 is formulated to have an absorption spectrum that includes the emission wavelength of the inputted light 208 (e.g., the excitation light 24) supplied from the LED sources 160. The photoluminescent material 18 is also formulated to have a Stokes shift resulting in the converted visible light 26 having an emission spectrum expressed in a desired color, which may vary per lighting application. The converted visible light 26 is outputted from the light assembly 72 via the viewable portion 144, thereby causing the viewable portion 144 to illuminate in the desired color. The illumination provided by the viewable portion 144 may offer a unique, substantially uniform, and/or attractive viewing experience that may be difficult to duplicate through non-photoluminescent means.

Figure 5C:
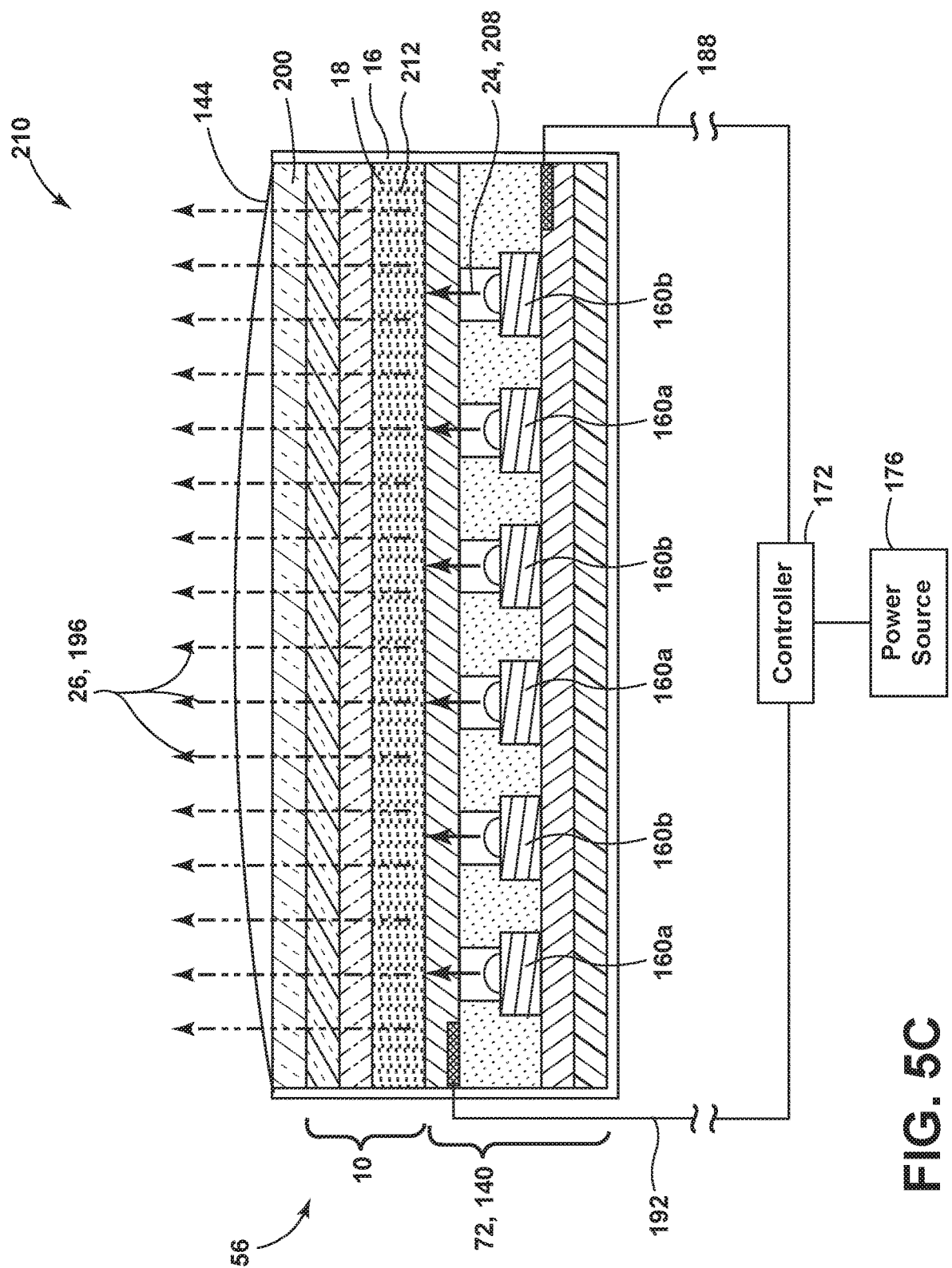
FIG. 5C is an enhanced view taken at section VC of FIG. 4 illustrating an alternate light assembly, according to at least one example.

Referring to FIG. 5C, a second energy conversion process 210 for generating multiple colors of light is illustrated, according to one embodiment. For consistency, the second energy conversion process 210 is also described below using the light assembly 72 depicted in FIG. 5A. In this embodiment, the energy conversion layer 16 includes the first and second photoluminescent materials 18, 212 that are interspersed within the energy conversion layer 16. Alternatively, the photoluminescent materials 18, 212 may be isolated from each other, if desired. Also, it should be appreciated that the energy conversion layer 16 may include more than two different photoluminescent materials 18 and 212, in which case, the teachings provided below similarly apply. In one embodiment, the second energy conversion process 210 occurs by way of down conversion using blue, violet, and/or UV light as the source of excitation.

With respect to the presently illustrated embodiment, the excitation of photoluminescent materials 18, 212 is mutually exclusive. That is, photoluminescent materials 18, 212 are formulated to have non-overlapping absorption spectrums and Stoke shifts that yield different emission spectrums. Also, in formulating the photoluminescent materials 18, 212, care should be taken in choosing the associated Stoke shifts such that the converted light 26 emitted from one of the photoluminescent materials 18, 212, does not excite the other, unless so desired. According to one exemplary embodiment, a first portion of the LED sources 160, exemplarily shown as LED sources 160a, is configured to emit an inputted light 208 having an emission wavelength that only excites photoluminescent material 18 and results in the inputted light 208 being converted into a visible light 26 of a first color (e.g., white). Likewise, a second portion of the LED sources 160, exemplarily shown as LED sources 160b, is configured to emit an inputted light 208 having an emission wavelength that only excites second photoluminescent material 212 and results in the inputted light 208 being converted into a visible light 26 of a second color (e.g., red). Preferably, the first and second colors are visually distinguishable from one another. In this manner, LED sources 160a and 160b may be selectively activated using the controller 172 to cause the photoluminescent structure 10 to luminesce in a variety of colors. For example, the controller 172 may activate only LED sources 160a to exclusively excite photoluminescent material 18, resulting in the viewable portion 144 illuminating in the first color. Alternatively, the controller 172 may activate only LED sources 160b to exclusively excite the second photoluminescent material 212, resulting in the viewable portion 144 illuminating in the second color.

Alternatively still, the controller 172 may activate LED sources 160a and 160b in concert, which causes both of the photoluminescent materials 18, 212 to become excited, resulting in the viewable portion 144 illuminating in a third color, which is a color mixture of the first and second colors (e.g., pinkish). The intensities of the inputted light 208 emitted from each of the LED sources 160a and 160b may also be proportionally varied to one another such that additional colors may be obtained. For energy conversion layers 16 containing more than two distinct photoluminescent materials 18, 212, a greater diversity of colors may be achieved. Contemplated colors include red, green, blue, and combinations thereof, including white, all of which may be achieved by selecting the appropriate photoluminescent materials 18, 212 and correctly manipulating the corresponding LED sources 160.

Figure 5D:
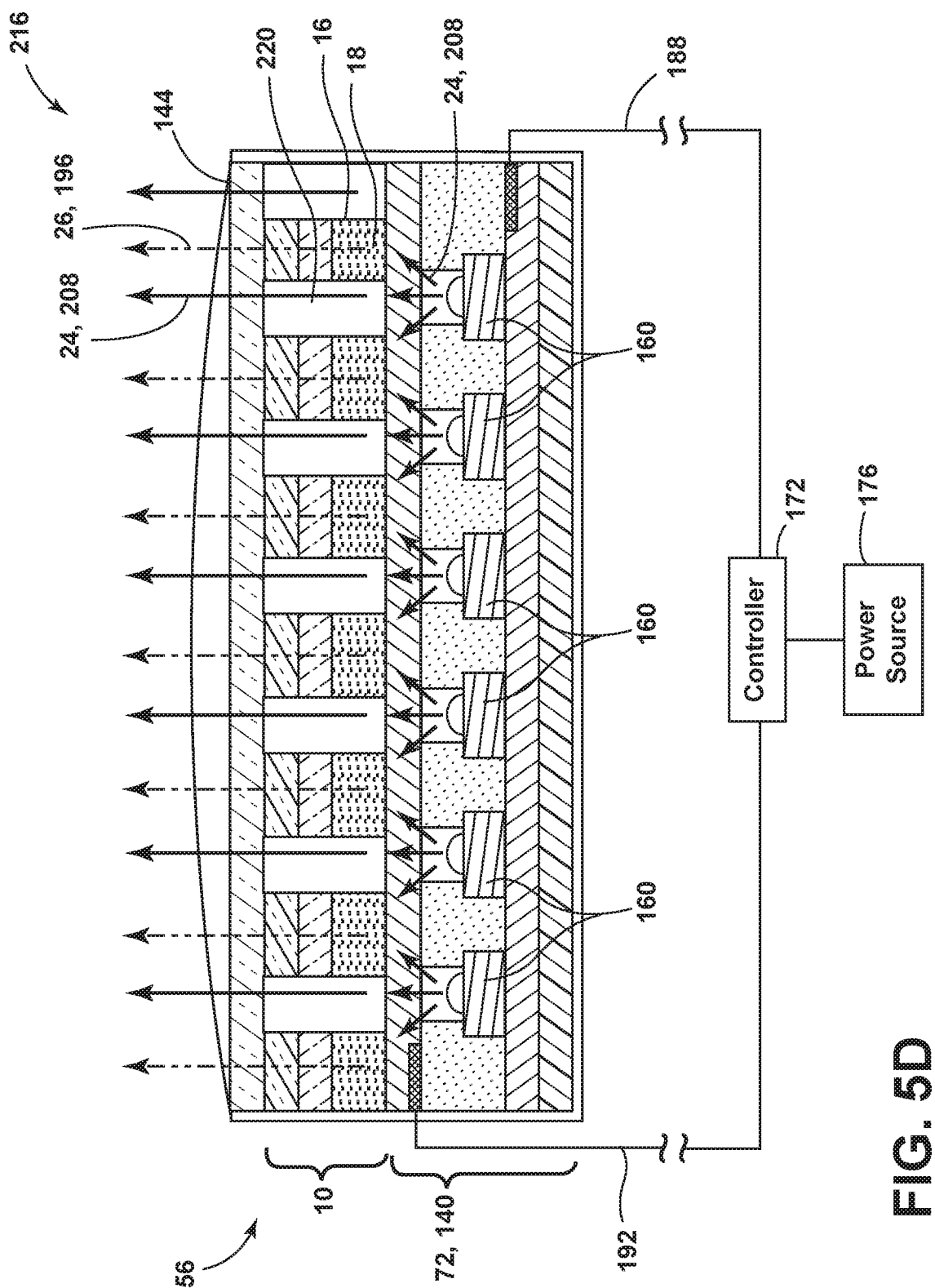
FIG. 5D is an enhanced view taken at section VD of FIG. 4 illustrating a light assembly having a luminescent structure separated by light transmissive portions disposed on the light source, according to at least one example.

Referring to FIG. 5D, a third energy conversion process 216 includes the light-producing assembly 140, such as the one described in reference to FIG. 5A, and the photoluminescent structure 10 disposed thereon, according to an alternate embodiment. The photoluminescent structure 10 is configured to convert inputted light 208 received from LED sources 160 into a visible light 26 having a wavelength different than that associated with the inputted light 208. More specifically, the photoluminescent structure 10 is formulated to have an absorption spectrum that includes the emission wavelength of the inputted light 208 supplied from the LED sources 160. The photoluminescent material 18 is also formulated to have a Stokes shift resulting in the converted visible light 26 having an emission spectrum expressed in a desired color, which may vary per lighting application.

The photoluminescent structure 10 may be applied to a portion of the light-producing assembly 140, for example, in a stripped manner. Between the photoluminescent structures 10 may be light transmissive portions 220 that allow inputted light 208 emitted from the LED sources 160 to pass therethrough at the first wavelength. The light transmissive portions 220 may be an open space, or may be a transparent or translucent material. The inputted light 208 emitted through the light transmissive portions 220 may be directed from the light-producing assembly 140 towards a second photoluminescent structure disposed proximate to the light-producing assembly 140. The second photoluminescent structure may be configured to luminesce in response to the inputted light 208 that is directed through the light transmissive portions 220.

Referring to FIG. 5E, a fourth energy conversion process 224 for generating multiple colors of light utilizing the light-producing assembly 140, such as the one described in reference to FIG. 5A, and a photoluminescent structure 10 disposed thereon is illustrated. In this embodiment, the photoluminescent structure 10 is disposed over a top portion of the light-producing assembly 140. The excitation of photoluminescent material 18 is formulated such that a portion of inputted light 208 emitted from LED sources 160c, 160d passes through the photoluminescent structure 10 at the first wavelength (i.e., the inputted light 208 emitted from the light-producing assembly 140 is not converted by the photoluminescent structure 10). The intensity of the emitted light (i.e., the combination of the inputted light 208 and converted light 26) may be modified by pulse-width modulation or current control to vary the amount of inputted light 208 emitted from the LED sources 160c, 160d that pass through the photoluminescent structure 10 without converting to a second, converted light 26 wavelength. For example, if the light-producing assembly 140 is configured to converted light 26 at a low level, substantially, all of the inputted light 208 may be converted to converted light 26. In this configuration, a color of converted light 26 corresponding to the photoluminescent structure 10 may be emitted from the light-producing assembly 140. If the light-producing assembly 140 is configured to emit inputted light 208 at a high level, only a portion of the first wavelength may be converted by the photoluminescent structure 10. In this configuration, a first portion of the emitted light may be converted by the photoluminescent structure 10 and a second portion of the emitted light may be emitted from the light-producing assembly 140 at the first wavelength towards additional photoluminescent structures (e.g., grate 76) disposed proximately to the light assembly 72. The additional photoluminescent structures may luminesce in response to the inputted light 208 emitted from the light assembly 72.

According to one exemplary embodiment, a first portion of the LED sources 160, exemplarily shown as LED sources 160c, is configured to emit an inputted light 208 having a wavelength that excites the photoluminescent material 18 within the photoluminescent structure 10 and results in the inputted light 208 being converted into a visible converted light 26 of a first color (e.g., white). Likewise, a second portion of the LED sources 160, exemplarily shown as LED sources 160d, are configured to emit an inputted light 208 having a wavelength that passes through the photoluminescent structure 10 and excites additional photoluminescent structures disposed proximately to the light assembly 72.

The viewable portion 144 may also include optics 230 that are configured to direct light emitted from the LED sources 160c, 160d and the converted light 26 emitted from the photoluminescent structure 10 towards pre-defined locations. For example, light from the LED sources 160c, 160d and the photoluminescent structure 10 may be directed and/or focused towards a ground to provide a puddle light. Further, different portions of the light assembly 72 may be activated to illuminate different locations in the vehicle 40.

Figure 6:
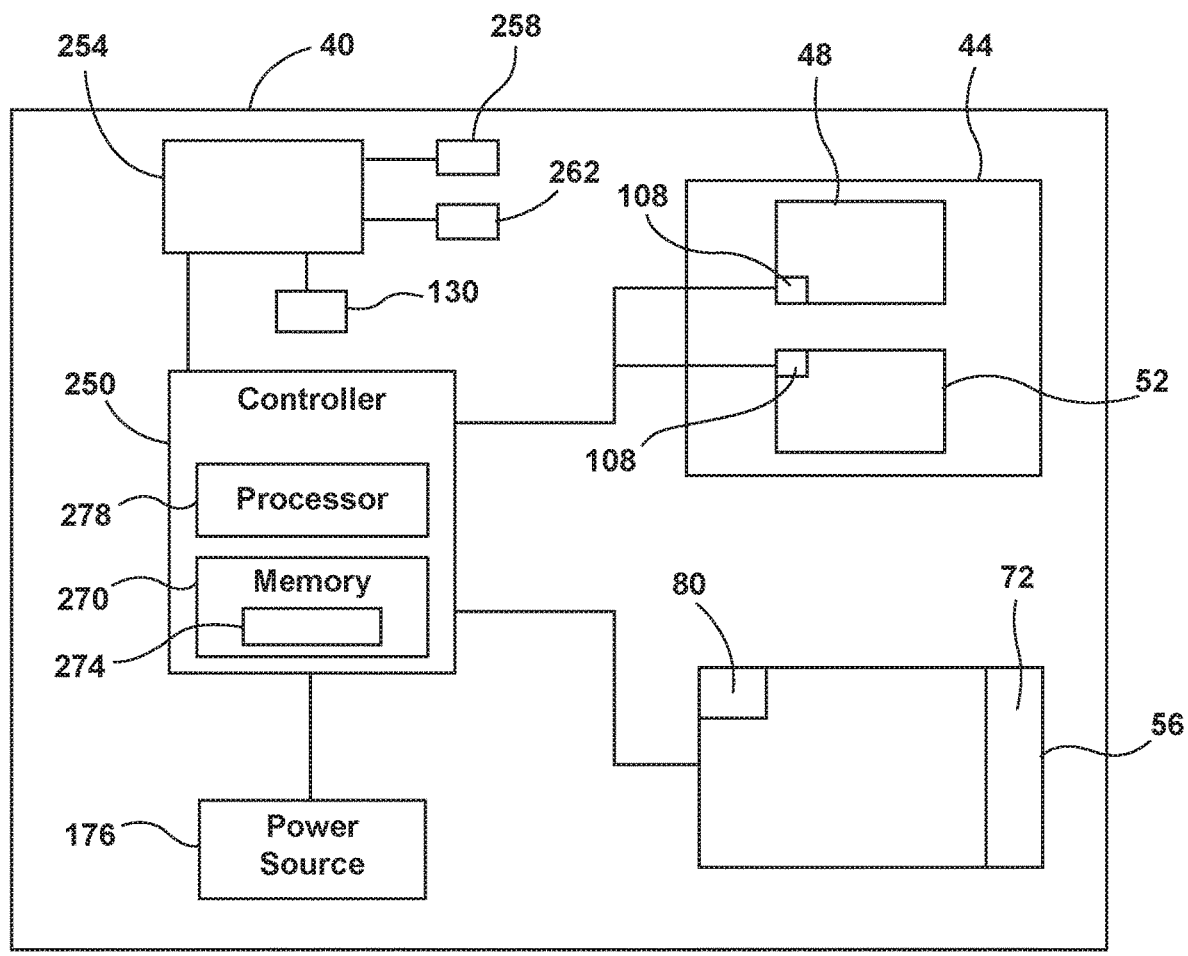
FIG. 6 is a block diagram of the vehicle.

Referring now to FIG. 6, depicted is a block diagram of the vehicle 40 in which the cargo carrier 56 is implemented. The vehicle 40 includes a controller 250 in communication with one or more vehicle control modules 254. The vehicle control module 254 may be configured to relay information to the controller 250 from a variety of sensors. Exemplary sensors include a trailer receiver sensor 258, an ambient light sensor 262 (e.g., a day/night sensor) and the orientation sensor 130.

The controller 250 may include a memory 270 having a light control routine 274 contained therein that is executed by a processor 278 of the controller 250. The controller 250 may provide electrical power to the light assembly 72 via the power source 176 located onboard the vehicle 40. In addition, the controller 250 may be configured to control the light emitted from the light assembly 72 and/or light sources 80 based on feedback received from the vehicle control module 254. The light control routine 274 may include a variety of routines configured to cause the controller 250 to vary the intensity, on/off status and/or color of the light emitted from the light assembly 72 and light sources 80.

In a first example, the light control routine 274 of the controller 250 may be configured to use the cargo carrier 56 to aid in alerting other vehicles that the vehicle 40 is braking. For example, the light control routine 274 may detect the activation of the brakes of the vehicle 40 and illuminate the light assembly 72 and/or one or more of the light sources 80 (e.g., through the electrode 134). When the cargo carrier 56 is in the deployed position (e.g., as sensed through the orientation sensor 130), the light assembly 72 may be activated to produce a red light which is emitted in a vehicle rearward direction in conjunction with braking. Further, while in the deployed position, one or more of the light sources 80 may be activated to excite the photoluminescent structure 10 on the grate 76 such that the photoluminescent structure 10 washes red light over the lift gate 84 to aid in indicating that the vehicle 40 is braking. While the cargo carrier 56 is in the undeployed position (i.e., the second surface 76B of the grate 76 is facing in a vehicle rearward direction), one or more of the light sources 80 may be activated to excite the photoluminescent structure 10 such that red light is emitted in the vehicle rearward direction.

In a second example, the light control routine 274 of the controller 250 may be configured to utilize input data from the ambient light sensor 262 to provide lighting from the cargo carrier 56. For example, while the vehicle 40 is parked and the ambient light sensor 262 detects low ambient light conditions (e.g., night), the light sources 80 and/or the light assembly 72 may be activated to provide ambient and/or task lighting. Further, the light control routine 274 may further utilize data from a proximity sensor positioned proximately a rear of the vehicle 40 to determine if task lighting should be activated.

In a third example, the light control routine 274 may activate the light sources 80 and/or light assembly 72 of the cargo carrier 56 while the carrier 56 is positioned within the cargo area 44. For example, the controller 250 may be capable of illuminating the cargo carrier 56 through the electrical connections 108 provided proximate the recessed portion 52 and/or the support track 48. Illumination of the cargo carrier 56 within the cargo area 44 may provide ambient and/or task lighting to the interior of the vehicle 40.

It will be understood that the light control routine 274 may perform any or all of the above noted examples, simultaneously or in sequence, without departing from the teachings provided herein.

Use of the present disclosure may offer a variety of advantages. First, illumination of the cargo carrier 56 allows an operator to use the cargo carrier 56 in low lighting conditions. Second, the illumination of the cargo carrier 56 provides a variety of ambient lighting and task lighting solutions to the vehicle 40. Third, the cargo carrier 56 may function as an auxiliary brake light which may be operated while the carrier 56 is in the deployed and/or undeployed orientations. Fourth, red ambient lighting provided by the cargo carrier 56 within the vehicle 40 may not affect a driver's night vision.

According to various embodiments, a cargo carrier includes a housing defining an interior surface and an exterior surface. A light assembly is positioned along the exterior surface. A grate is positioned within the housing. A luminescent structure is positioned on the grate. A light source is positioned on the interior surface and configured to emit light onto the luminescent structure. Embodiments of the cargo carrier can include any one or a combination of the following features:
- the luminescent structure is further positioned on the interior surface;
- the grate defines a first surface and a second surface and the luminescent structure is positioned on both the first and second surfaces;
- a first light source is positioned proximate the first surface of the grate and a second light source is positioned proximate the second surface of the grate;
- a sensor configured to detect an orientation of the cargo carrier;
- the sensor is coupled with a trailer electrical mount;
- a trailer mount configured to support the cargo carrier;
- the light assembly is positioned on a vehicle rear surface of the exterior surface;
- a photoluminescent structure positioned on the light assembly;
- the luminescent structure comprises a phosphorescent material;
- the light assembly positioned is configured to emit light when the cargo carrier is in the deployed position; and/or the cargo carrier is further configured to couple with a trailer receiver of the vehicle.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the endpoints of each of the ranges are significant both in relation to the other endpoint, and independently of the other endpoint.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

It will be apparent to those skilled in the art that various modifications and variations can be made to the present disclosure without departing from the spirit and scope of the disclosure. Thus, it is intended that the present disclosure cover such modifications and variations provided they come within the scope of the appended claims and their equivalents.

What is claimed is:

1. A cargo carrier, comprising:
   a housing defining an interior surface and an exterior surface;
   a light assembly positioned along the exterior surface;
   a grate positioned within the housing;
   a luminescent structure positioned on the grate; and
   a light source positioned on the interior surface and configured to emit light onto the luminescent structure.

2. The cargo carrier of claim 1, wherein the luminescent structure is further positioned on the interior surface.

3. The cargo carrier of claim 1, wherein the grate defines a first surface and a second surface and the luminescent structure is positioned on both the first and second surfaces.

4. The cargo carrier of claim 3, wherein a first light source is positioned proximate the first surface of the grate and a second light source is positioned proximate the second surface of the grate.

5. The cargo carrier of claim 1, further comprising:
   a sensor configured to detect an orientation of the cargo carrier.

6. The cargo carrier of claim 5, wherein the sensor is coupled with a trailer electrical mount.

7. The cargo carrier of claim 1, further comprising:
   a trailer mount configured to support the cargo carrier.

8. The cargo carrier of claim 1, wherein the light assembly is positioned on a vehicle rear surface of the exterior surface.

9. The cargo carrier of claim 1, further comprising:
   a photoluminescent structure positioned on the light assembly.

10. A vehicle, comprising:
    a trailer receiver;
    a cargo carrier coupled to the trailer receiver and having a grate;
    an orientation sensor configured to detect whether the cargo carrier is an undeployed or a deployed position; and
    a light assembly positioned on the cargo carrier and configured to emit light onto the grate when the cargo carrier is in the deployed position.

11. The vehicle of claim 10, further comprising:
    a photoluminescent structure positioned on an interior surface of the cargo carrier.

12. The vehicle of claim 10, wherein the grate defines a first surface and a second surface and a photoluminescent structure is positioned on at least one of the first and second surfaces.

13. The vehicle of claim 12, wherein the photoluminescent structure is positioned on both the first and second surfaces.

14. A vehicle, comprising:
    a cargo area, comprising:
      a support track; and
      a recessed portion; and
    a cargo carrier, comprising:
      a housing;
      a grate positioned within the housing;
      a luminescent structure positioned on the grate, wherein the cargo carrier is configured to couple with both the support track and the recessed portion; and
      a light source configured to emit light towards the luminescent structure.

15. The vehicle of claim 14, further comprising:
    a light assembly positioned on an exterior surface of the housing.

16. The vehicle of claim 14, wherein the luminescent structure comprises a phosphorescent material.

17. The vehicle of claim 14, wherein the light source is positioned within the housing.

18. The vehicle of claim 14, wherein the cargo carrier is further configured to couple with a trailer receiver of the vehicle.

19. The vehicle of claim 14, further comprising:
an orientation sensor configured to detect an orientation of the cargo carrier.

* * * * *